United States Patent [19]

Okawa

[11] Patent Number: 5,041,591

[45] Date of Patent: Aug. 20, 1991

[54] ORGANOPOLYSILOXANE AND METHOD FOR ITS PREPARATION

[75] Inventor: Tadashi Okawa, Ichihara, Japan

[73] Assignee: Dow Corning Toray Silicone Company, Ltd., Tokyo, Japan

[21] Appl. No.: 567,888

[22] Filed: Aug. 15, 1990

[51] Int. Cl.$^5$ .............................................. C07F 7/08
[52] U.S. Cl. .................................................. 556/434
[58] Field of Search ........................................ 556/434

[56] References Cited

U.S. PATENT DOCUMENTS

| | | | |
|---|---|---|---|
| 3,440,214 | 4/1969 | Quaal | 556/434 X |
| 3,445,495 | 5/1969 | Nelson | 556/434 X |
| 3,455,878 | 7/1969 | Quaal | 556/434 X |
| 3,819,674 | 6/1974 | Rudolph et al. | 556/434 |
| 4,057,566 | 11/1977 | Carter et al. | 556/434 |
| 4,900,779 | 2/1990 | Liebfried | 556/434 X |

FOREIGN PATENT DOCUMENTS

| | | | |
|---|---|---|---|
| 1107941 | 5/1961 | Fed. Rep. of Germany | 556/434 |
| 0199520 | 11/1984 | Japan | 556/434 |

Primary Examiner—Paul F. Shaver
Attorney, Agent, or Firm—George A. Grindahl

[57] ABSTRACT

The present invention provides an organohydrogenpolysiloxane which does not have an average chemical structure as encountered with organopolysiloxanes prepared by equilibration polymerization reactions, but rather which has a clear, defined chemical structure in which the position and number of silicon-bonded hydrogen groups is clearly defined. The organopolysiloxane has a branched structure in the vicinity of one terminal of the molecular chain and has the silicon-bonded hydrogen group at each of the resulting derivative terminals. The organopolysiloxanes can be addition-reacted with, for example, organic compounds having various functional groups to give organopolysiloxane having two organofunctional groups clustered at one terminal.

6 Claims, No Drawings

ORGANOPOLYSILOXANE AND METHOD FOR ITS PREPARATION

BACKGROUND OF THE INVENTION

The present invention relates to a novel organopolysiloxane and, more particularly, relates to an organopolysiloxane which has a branching structure in the neighborhood of one terminal of the molecular chain and which contains the silicon-bonded hydrogen group at each of the resulting derivative terminals. The invention also relates to a method for the preparation of this organopolysiloxane.

It is already well known that organopolysiloxanes containing various types of organofunctional groups may be prepared by a hydrosilylation reaction between SiH group-containing organopolysiloxane and an organic compound whose molecule contains both an aliphatically unsaturated group as well as any of various organofunctional groups. With regard to the organofunctional organopolysiloxanes obtained in this manner, the fundamental structure in terms of number of functional groups and so forth is directly determined by the starting SiH group-containing organopolysiloxane.

Because the organopolysiloxanes used for such modifications are generally prepared by an equilibration polymerization reaction between SiH group-containing organopolysiloxane and SiH group-free organopolysiloxane, the product therefrom takes the form of a mixture of different degrees of polymerization. Thus, the product's chemical structure can be no more than an average, and, accordingly, the number of silicon-bonded hydrogen groups in the individual molecules is also an average. This poses the problem that the number of functional groups in the final organofunctional organopolysiloxane product is also only an average.

However, while the modification of organic polymeric compounds by organofunctional organopolysiloxane has entered into widespread use in the fine chemicals sector, this has occurred at the same time as an increasing requirement for strict control over the number of functional groups. As a particular matter, the use of organofunctional organopolysiloxane in polycondensation reactions requires the systematic introduction of only two functional groups into each molecule. Nevertheless, in the case of organofunctional organopolysiloxane based on SiH group-containing organopolysiloxane obtained by an equilibration polymerization reaction, even when two functional groups are present on average, organopolysiloxane is present which not only contains 2 functional groups, but also, for example, zero, one, or three or more functional groups. This engenders such problems as gelation during the process, or activity as a reaction terminator, or residual unreacted material in the system.

In order to avoid these problems, it has been proposed that the SiH group-containing organopolysiloxane be prepared by a non-equilibration polymerization reaction. Thus, organopolysiloxane containing the terminal silicon-bonded hydrogen group can be prepared by the ring-opening polymerization of hexamethylcyclotrisiloxane using alkyllithium or lithium silanolate as the polymerization initiator, followed by termination of the reaction using dimethylchlorosilane and so forth. However, only 1 silicon-bonded hydrogen group can be introduced at the corresponding molecular terminal in this method, which accordingly creates the restriction that only a single organofunctional group can be introduced at the molecular chain terminal.

In contrast to this, in order to obtain graft copolymers between organofunctional organopolysiloxane and other organic polymers, it would be desirable to have two organofunctional groups clustered or segregated at one terminal. Nevertheless, neither the corresponding starting organopolysiloxane having two silicon-bonded hydrogen groups clustered at one terminal nor a method for the preparation of such an organopolysiloxane have been available up to the present time.

BRIEF SUMMARY OF THE INVENTION

The present invention seeks to overcome the aforementioned problems in the prior art through the introduction of an organopolysiloxane which does not have an average chemical structure as encountered with organopolysiloxanes prepared by equilibration polymerization reactions, but rather which has a clear, defined chemical structure, i.e., in which the position and number of silicon-bonded hydrogen groups is clearly defined. Furthermore, the present invention introduces an organopolysiloxane which cannot be prepared by an equilibration polymerization reaction in that it has a branching structure in the vicinity of one terminal of the molecular chain and has the silicon-bonded hydrogen group at each of the resulting derivative terminals. Finally, the present invention introduces a method for the preparation of said organopolysiloxane.

DETAILED DESCRIPTION OF THE INVENTION

The present invention relates to organopolysiloxane having the formula

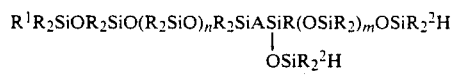

wherein R and $R^1$ in each case represent identical or different monovalent hydrocarbon groups which are free of aliphatically unsaturated bonds, $R^2$, represent the same or different monovalent hydrocarbon groups, A represents a divalent hydrocarbon group which is free of aliphatically unsaturated bonds, n is an integer with a value of zero to 100, m is an integer with a value of zero to 10, and n>m except when n and m are zero.

The invention further relates to a method for the preparation of organopolysiloxane having the formula

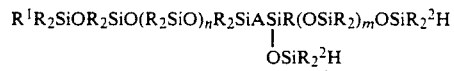

wherein R and $R^1$ in each case represent identical or different monovalent hydrocarbon groups which are free of aliphatically unsaturated bonds, $R^2$ represents the same or different monovalent hydrocarbon groups, A represents a divalent hydrocarbon group which is free of aliphatically unsaturated bonds, n is an integer with a value of zero to 100, m is an integer with a value of zero to 10, and n>m except when n and m are zero; said method comprising (a) executing an addition reaction between an organopolysiloxane having the formula $R^1R_2SiOR_2SiO(R_2SiO)_nR_2SiH$ wherein R and $R^1$ are the same or different monovalent hydrocarbon groups which are free of aliphatically unsaturated bonds and n is an integer with a value of zero to 100 and an organodichlorosilicon compound having the formula $BSiRCl(OSiR_2)_mCl$ wherein R is defined as above, B is a monovalent hydrocarbon group which contains an aliphatically unsaturated bond, and m is an integer with a value of zero to 10 wherein n > m except when n and m are zero to give organopolysiloxane with the formula $R^1R_2SiOR_2SiO(R_2SiO)_nR_2SiASiClR(OSiR_2)_mCl$ wherein A is a divalent hydrocarbon group which is free of aliphatically unsaturated bonds;

(b) hydrolyzing the product of step (a) to afford an organopolysiloxane having the formula $R^1R_2SiOR_2SiO(R_2SiO)_nR_2SiASiR(OSiR_2)_mOH$ and
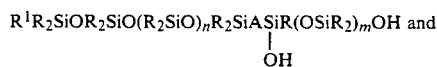

(c) reacting the silicon-bonded hydroxyl groups in the organopolysiloxane of step (b) with a diorganohydrogenchlorosilane having formula $R^2_2SiHCl$.

To explain the preceding in greater detail, the groups R and $R^1$ in the organopolysiloxane of the present invention in each case comprise monovalent hydrocarbon groups which are free of aliphatically unsaturated bonds, and these may be identical to or different from each other. Examples in this regard are alkyl groups such as methyl, ethyl, propyl, butyl, pentyl, and hexyl; aryl groups such as phenyl, tolyl, and xylyl; and aralkyl groups such as benzyl and phenethyl. The groups $R^2$ comprise monovalent hydrocarbon groups, and these are exemplified not only as for the groups R and $R^1$ above, but also by alkenyl groups such as vinyl, allyl, butenyl, and hexenyl. R is preferably the methyl group from the standpoints of ease of synthesis and economics. The groups $R^1$ and $R^2$ are preferably methyl or monovalent hydrocarbon groups having up to 6 carbon atoms.

The group A is a divalent hydrocarbon group which is free of aliphatically unsaturated bonding, and examples here are alkylene groups such as ethylene, propylene, and butylene. This group may be branched. The ethylene group is preferred considering ease of synthesis and economics.

The subscript is an integer with a value of zero to 100, but values of zero to 60 are preferred and values of 5 to 50 are particularly preferred from the standpoint of the properties of the organofunctional organopolysiloxane. The subscript m is an integer with a value of zero to 10, but values of zero to 6 are preferred considering ease of synthesis and economics. The value of n is to exceed the value of m except that n and m can be zero.

The present invention's preparative method is depicted by the following reaction equations.

$R^1R_2SiOR_2SiO(R_2SiO)_nR_2SiH + BSiRCl(OSiR_2)_mCl \longrightarrow$
  (I)                                  (II)

$R^1R_2SiOR_2SiO(R_2SiO)_nR_2SiASiR(OSiR_2)_mCl$ (III)
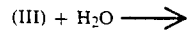

(III) + $H_2O \longrightarrow$ $R^1R_2SiOR_2SiO(R_2SiO)_nR_2SiASiR(OSiR_2)_mOH$ (IV)
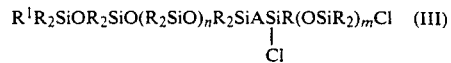

-continued (IV) + $R_2^2SiHCl \longrightarrow$ $R^1R_2SiOR_2SiO(R_2SiO)_nR_2SiASiR(OSiR_2)_mOSiR_2^2H$ (V)
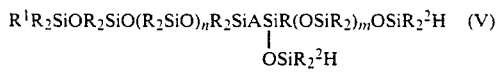

To explain this in greater detail, the organopolysiloxane having the SiH group at one molecular chain terminal (formula (I) in which n is greater than 1) can be synthesized by the nonequilibration polymerization of cyclic hexaorganotrisiloxane under the action of an organolithium compound such as an alkyllithium or aryllithium or a lithium metal salt such as a lithium triorganosilanolate or alpha-lithiumoxydiorganopolysiloxane, as is well-known. Diorganohydrogenchlorosilane is used as the terminator. It is possible to control both the molecular weight and molecular weight distribution of the thus obtained organopolysiloxane having the silicon-bonded hydrogen group at one molecular chain terminal.

The organopolysiloxane having the SiH group at one molecular chain terminal (formula (I) in which n is less than 2) can be synthesized by the cohydrolysis of suitable chlorosilanes, followed by recovery of the desired di or trisiloxanes but well-known purification methods, such as fractional distillation.

The group B in the dichlorosilicon compound with formula (II) is a monovalent hydrocarbon group which contains an aliphatically unsaturated bond, and examples in this regard are alkenyl groups such as vinyl, allyl, butenyl, pentenyl, and hexenyl; the acryloxypropyl group; the methacryloxypropyl group; the styryl group; and the vinylbenzyl group. The vinyl group is the most preferred from the standpoints of ease of synthesis and economics.

The dichlorosilicon compound (formula (II) in which m is greater than 2) can be synthesized by the reaction of a dichlorosilane having the formula $BRSiCl_2$ with a cyclic hexaorganotrisiloxane under the action of an amine-containing catalyst, such as methylamine, according to the method of Brown et al., U.S. Pat. No. 3,162,662. The dichlorosilicon compound (formula (II) in which m is less than 3) can be synthesized by the limited co-hydrolysis reaction of a dichlorosilane having the formula $BRSiCl_2$ with a dichlorosilane having the formula $R_2SiCl_2$.

With regard to the reaction between organopolysiloxane (I) and dichlorosilane or dichlorosiloxane (II), the latter should be at least equimolar with the former, and the use of at least 1.2-fold equivalents is preferred. This addition reaction is catalyzed by transition metal complex catalysts from Group VIII of the Periodic Table, and platinum-based catalysts are particularly effective. Preferred examples here are platinum compounds such as chloroplatinic acid and its alcohol solutions, the olefin complexes of platinum, and complexes between platinum and vinyl-containing siloxane. While this addition reaction may be conducted without solvent, its execution in the presence of a suitable solvent is preferred. Examples of the solvent are aromatics such as benzene, toluene, and xylene; aliphatics such as hexane and heptane; ethers such as tetrahydrofuran and diethyl ether; ketones such as acetone and methyl ethyl ketone; esters such as ethyl acetate and butyl acetate; chlorinated hydrocarbons such as carbon tetrachloride, trichloroethane, and chloroform; as well as dimethylformamide and dimethyl sulfoxide. The reaction may even be conducted at room temperature, but as a general matter its execution at temperatures in the neighborhood of 50 to 200 degrees Centigrade is advantageous in terms of reaction rate.

The hydrolysis reaction of organopolysiloxane (III) must be run very carefully in order suppress condensation reactions among the silicon-bonded hydroxyl groups produced by the hydrolysis reaction. The recommended method consists of hydrolysis of organopolysiloxane (III) using a dilute aqueous alkaline solution while cooling.

The reaction between the diorganohydrogenchlorosilane $R^2{}_2SiHCl$ and organopolysiloxane (IV) synthesized as above proceeds readily via dehydrochlorination to afford the organopolysiloxane with formula (V) in a simple manner. In order to inhibit condensation reactions among the silicon-bonded hydroxyl groups in the starting organopolysiloxane (IV) and in order to inhibit any equilibration depolymerization reaction of the organopolysiloxane chain, it is recommended that a hydrogen chloride binder, such as an amine, be used in this reaction.

Because it contains 2 silicon-bonded hydrogen groups in the vicinity of one terminal of the molecular chain, the organopolysiloxane thus obtained can be used as a intermediate. As a particular matter, organopolysiloxanes containing any of various organofunctional groups can be easily prepared by the addition through the hydrosilylation reaction of an organic compound which contains both an aliphatically unsaturated group and any of various functional groups. It is therefore extremely useful as an intermediate for modifiers or improvers for organic resins.

The present invention is explained further with reference to the following illustrative examples. In these examples, %=weight %, Me=the methyl group, Bu=the butyl group, Vi=the vinyl group, and Ph=the phenyl group.

EXAMPLE 1

The following were placed in a four-neck flask equipped with a stirring device: 30 g (8.1 mmol) of a dimethylpolysiloxane with the formula $Bu(Me_2SiO)_{4.9}Me_2SiH$ (actual value for SiH hydrogen=0.027%, this dimethylpolysiloxane is abbreviated below as H-1), 1.4 g (9.7 mmol) vinylmethyldichlorosilane, and chloroplatinic acid/tetramethyldivinyldisiloxane complex (to provide 20 ppm platinum metal referred to the total quantity of H-1 and vinylmethyldichlorosilane). After heating for 2 hours at 60 to 70 degrees Centigrade, the extinction of absorption characteristic of SiH was confirmed on a sample by infrared spectral analysis (IR). Distillation in vacuo of the excess vinylmethyldichlorosilane afforded a polysiloxane with the following formula $Bu(Me_2SiO)_{4.9}Me_2SiC_2H_4MeSiCl_2$.

150 Grams water, 150 g ice, 50 mL diethyl ether, and 2.0 g sodium bicarbonate were placed in a stirrer-equipped four-neck flask, and a mixture of the above polysiloxane and 50 mL diethyl ether was dripped in while cooling and stirring. After layer separation, the ether layer was dried over anhydrous sodium sulfate, and the ether was then evaporated off in vacuo at room temperature to afford a polysiloxane with the following formula $Bu(Me_2SiO)_{4.9}Me_2SiC_2H_4MeSi(OH)_2$.

25 Grams of this polysiloxane (corresponds to 6.6 mmol), 1.5 g (15.9 mmol) dimethylchlorosilane, 2.4 g (23.7 mmol) triethylamine, and 50 mL toluene were placed in a four-neck flask equipped with a stirring device, and a reaction was run for 5 hours at room temperature. After filtration, a polymer was obtained by evaporating off the solvent and unreacted material by distillation in vacuo. This polymer was confirmed to be a polysiloxane with the following formula through gel permeation chromatography (GPC), nuclear magnetic resonance analysis (NMR), infrared spectral analysis (IR), and iodometric quantitation of the SiH group. $Bu(Me_2SiO)_{4.9}Me_2SiC_2H_4MeSi(OH)_2$.

EXAMPLE 2

Proceeding as in Example 1 using 30 g (16.5 mmol) of a dimethylpolysiloxane with the following formula $Bu(Me_2SiO)_{23}Me_2SiH$ (actual SiH hydrogen value=0.055%, this dimethylpolysiloxane is abbreviated below as H-2) and 2.8 g (20.0 mmol) vinylmethyldichlorosilane, a polysiloxane with the formula $Bu(Me_2SiO)_{23}Me_2SiC_2H_4MeSiCl_2$ was obtained.

Proceeding as in Example 1, a mixture of this polysiloxane and 50 mL diethyl ether was dripped into a mixture of 150 g water, 150 g ice, 100 mL diethyl ether, and 4.2 g sodium bicarbonate to afford a polysiloxane with the formula $Bu(Me_2SiO)_{23}Me_2SiC_2H_4MeSi(OH)_2$.

Into a solution of 27 g (14.2 mmol) of this polysiloxane in 50 mL toluene were introduced 3.2 g dimethylchlorosilane (33.8 mmol) and 5.2 g triethylamine (51.4 mmol), and a polymer was prepared as in Example 1. This polymer was confirmed to be a polysiloxane with the following formula based on GPC, NMR, IR, and SiH group iodometric quantitation. $Bu(Me_2SiO)_{23}Me_2SiC_2H_4MeSi(OSiMe_2H)_2$

EXAMPLE 3

Proceeding from 30 g (16.5 mmol) H-2 as described in Example 2 and 7.3 g (20.1 mmol) $MeViClSi(OSiMe_2)_2Cl$, a polysiloxane with the following formula was obtained as in Example 1. $Bu(Me_2SiO)_{23}Me_2SiC_2H_4MeClSi(OMe_2Si)_3Cl$ The mixture of this polysiloxane in 50 mL diethyl ether was dripped into a mixture of 150 g water, 150 g ice, 100 mL diethyl ether, and 4.2 g sodium bicarbonate, and a polysiloxane with the following formula was obtained proceeding as in Example 1.

3.2 Grams (33.8 mmol) dimethylchlorosilane and 5.2 g (51.1 mmol) triethylamine were introduced into a solution of 30 g (corresponds to 14.1 mmol) of this polysiloxane in 50 mL toluene, and a polymer was obtained as in Example 1. This polymer was confirmed to be a polysiloxane with the following formula based on GPC, NMR, IR, and SiH group iodometric quantitation.

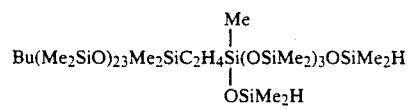

EXAMPLE 4

Proceeding from 30 g (16.5 mmol) H-2 and 4.1 g (20.2 mmol) phenylvinyldichlorosilane, a polysiloxane with the following formula was obtained as in Example 1.

The mixture of this polysiloxane in 50 mL diethyl ether was dripped into a mixture of 150 g water, 150 g ice, 100 mL diethyl ether, and 4.2 g sodium bicarbonate, and a polysiloxane with the following formula was obtained proceeding as in Example 1.

$$Bu(Me_2SiO)_{23}Me_2SiC_2H_4PhSi(OH)_2$$

3.1 Grams (32.8 mmol) dimethylchlorosilane and 5.0 g (49.4 mmol) triethylamine were introduced into a solution of 27 g (corresponds to 13.8 mmol) of this polysiloxane in 50 mL toluene, and a polymer was obtained as in Example 1. This polymer was confirmed to be a polysiloxane with the following formula based on GPC, NMR, and IR.

$$Bu(Me_2SiO)_{23}Me_2SiC_2H_4PhSi(OSiMe_2H)_2$$

EFFECTS OF THE INVENTION

The novel organopolysiloxane of the present invention is a structurally unique intermediate in that it has a branching structure in the neighborhood of one terminal of the molecular chain and in that the silicon-bonded hydrogen group is present at each of the resulting derivative terminals. The preparative method of the present invention is distinctive in that it readily affords a defined chemical structure which is not an average chemical structure as would be obtained by preparation by an equilibration polymerization reaction. As this may be addition-reacted with organic compounds having various functional groups to give organopolysiloxane having two organofunctional groups clustered at one terminal, a further distinguishing feature is that it becomes a simple matter to obtain heretofore inaccessible graft polymers between organic polymers and organopolysiloxane.

That which is claimed is:

1. An organopolysiloxane having the formula $$\begin{array}{c} R^1R_2SiOR_2SiO(R_2SiO)_nR_2SiASiR(OSiR_2)_mOSiR_2^2H \\ | \\ OSiR_2^2H \end{array}$$

wherein R and $R^1$ in each case represent identical or different monovalent hydrocarbon groups which are free of aliphatically unsaturated bonds, $R^2$ represent the same or different monovalent hydrocarbon groups, A represents a divalent hydrocarbon group which is free of aliphatically unsaturated bonds, n is an integer with a value of zero to 100, m is an integer with a value of zero to 10, and n>m except when n and m are zero.

2. An organopolysiloxane in accordance with claim 1 wherein each R is methyl, each $R^2$ is methyl, $R^1$ contains from 1 to 6 carbon atoms and A is —$CH_2CH_2$—.

3. An organopolysiloxane in accordance with claim 1 wherein m=0.

4. A method for the preparation of organopolysiloxane having the formula $$\begin{array}{c} R^1R_2SiOR_2SiO(R_2SiO)_nR_2SiASiR(OSiR_2)_mOSiR_2^2H \\ | \\ OSiR_2^2H \end{array}$$

wherein R and $R^1$ each case represent identical or different monovalent hydrocarbon groups which are free of aliphatically unsaturated bonds, $R^2$ represents the same or different monovalent hydrocarbon groups, A represents a divalent hydrocarbon group which is free of aliphatically unsaturated bonds, n is an integer with a value of zero to 100, m is an integer with a value of zero to 10, and n>m;

(a) executing an addition reaction between an organopolysiloxane having the formula $R^1R_2SiOR_2SiO(R_2SiO)_nR_2SiH$ wherein R and $R^1$ are the same or different monovalent hydrocarbon groups which are free of aliphatically unsaturated bonds and n is an integer with a value of zero to 100 and an organodichlorosilicon compound as having the following formula $BSiRCl(OSiR_2)_mCl$ wherein R is defined as above, B is a monovalent hydrocarbon group which contains an aliphatically unsaturated bond, and m is an integer with a value of zero to 10 wherein n>m except when n and m are zero to give an organopolysiloxane having the formula $$\begin{array}{c} R^1R_2SiOR_2SiO(R_2SiO)_nR_2SiASiR(OSiR_2)_mCl \\ | \\ Cl \end{array}$$

wherein A is a divalent hydrocarbon group which is free of aliphatically unsaturated bonds;

(b) hydrolyzing the product of step (a) to afford an organopolysiloxane having the formula $$\begin{array}{c} R^1R_2SiOR_2SiO(R_2SiO)_nR_2SiASiR(OSiR_2)_mOH \text{ and} \\ | \\ OH \end{array}$$

(c) reacting the silicon-bonded hydroxyl groups in the organopolysiloxane of step (b) with a diorganohydrogenchlorosilane having formula $R^2_2SiHCl$.

5. A method in accordance with claim 4 wherein each R is methyl, each $R^1$ is methyl, $R^1$ contains from 1 to 6 carbon atoms and A is —$CH_2CH_2$—.

6. An organopolysiloxane in accordance with claim 4 wherein m=0.

* * * * *